W. F. GONGAWARE.
INDICIA DEVICE FOR CAMERAS.
APPLICATION FILED FEB. 24, 1916. RENEWED DEC. 19, 1917.
1,254,590.
Patented Jan. 22, 1918.
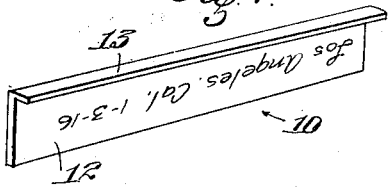
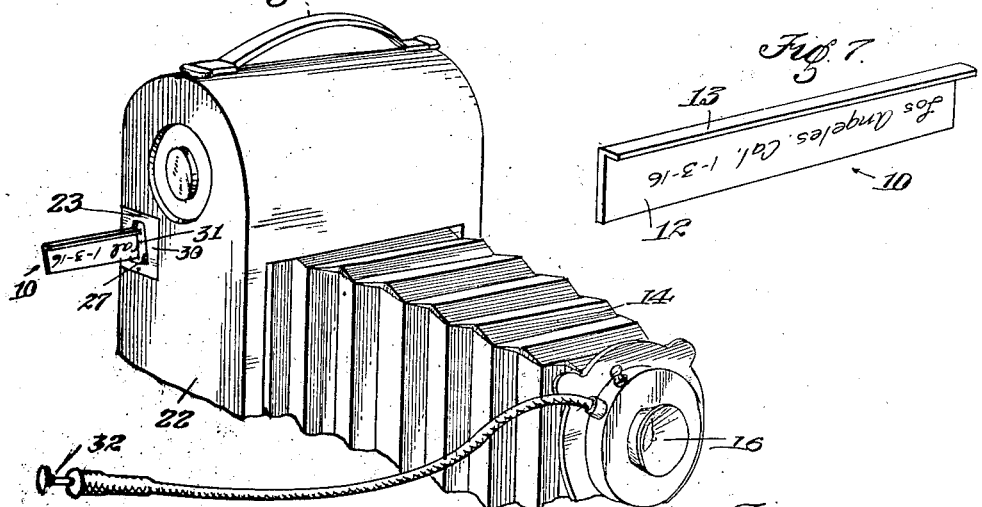
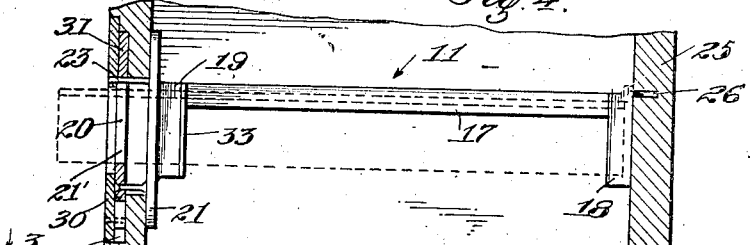
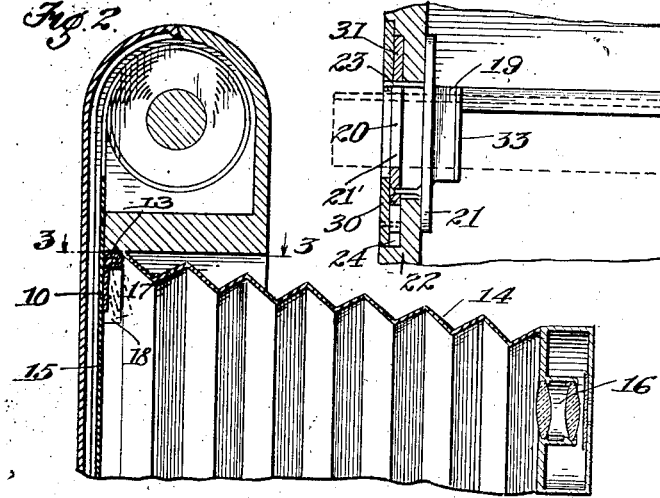
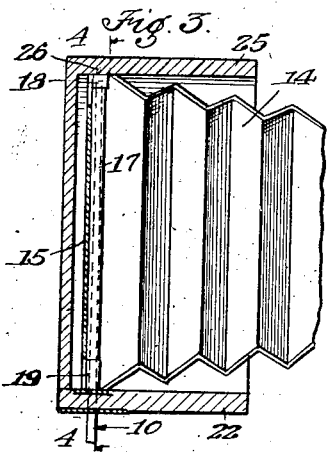
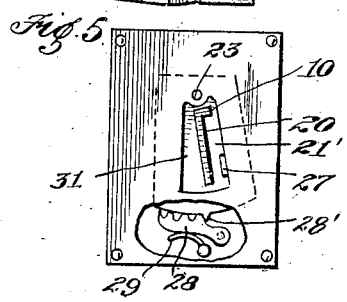
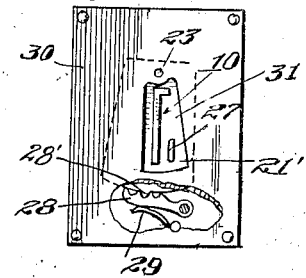
Inventor,
William F. Gongaware
by Hazard Berry & Miller
attys

UNITED STATES PATENT OFFICE.

WILLIAM F. GONGAWARE, OF OCEANPARK, CALIFORNIA.

INDICIA DEVICE FOR CAMERAS.

1,254,590.  Specification of Letters Patent.  Patented Jan. 22, 1918.

Application filed February 24, 1916, Serial No. 80,174. Renewed December 19, 1917. Serial No. 207,980.

*To all whom it may concern:*

Be it known that I, WILLIAM F. GONGAWARE, a citizen of the United States, residing at Oceanpark, in the county of Los Angeles and State of California, have invented new and useful Improvements in Indicia Devices for Cameras, of which the following is a specification.

This invention relates to an indicia device for cameras.

It is an object of this invention to provide a means whereby titles, dates, or other inscriptions may be photographically recorded upon a film or plate simultaneously with the exposure of the film or plate through the camera lens.

Another object is to provide a construction and arrangement whereby the inscription may be recorded without the use of auxiliary lenses or shutters.

Another object is to provide a translucent indicia receiving strip with means for receiving and supporting same within the camera.

A further object is to provide means whereby the indicia strip may be readily inserted and removed from the camera without fogging the film or plate.

It is another object to provide an adjustable mounting within the camera for the indicia strip and means whereby said indicia strip may be drawn into intimate contact with the film or plate.

Other objects will appear hereinafter.

The invention is illustrated in the accompanying drawings in which:

Figure 1 is a perspective view of a portion of a camera showing the location of my device and an indicia strip in the act of being inserted.

Fig. 2 is a vertical section through a like portion of the camera as shown in Fig. 1 and discloses the mounting of my indicia strip in relation to the camera bellows and lens.

Fig. 3 is a horizontal section taken on the line 3—3 of Fig. 2.

Fig. 4 is an enlarged view in section taken on the line 4—4 of Fig. 3 and discloses in detail the mounting for the indicia strip.

Fig. 5 is a view in elevation of the end of my device as it appears upon the outside of the camera and showing the indicia strip mounted in its inoperative position.

Fig. 6 is a view similar to Fig. 5 showing the indicia strip as positioned in intimate contact with the film or plate.

Fig. 7 is an enlarged perspective view of the indicia strip.

Briefly considered, my device consists of an indicia strip or screen 10 and its mounting within the camera, as indicated at 11. The indicia strip is formed of a translucent material into a rectangular strip or screen 12 having along one of its longitudinal edges a key portion 13 which is of considerably less width than the portion 12 and extends at right angles thereto. When the indicia strip is so formed it has a transverse section of angular shape, one leg of said angle being shorter than the other and at right angles thereto.

The mounting 11 which I have provided for the indicia strip is located within the bellows 14 of the camera and at the upper rear edge thereof. In this position the indicia strip will be brought into close proximity with the film or plate 15 so that light rays passing through the photographic lenses 16 will simultaneously fall upon the film and the indicia strip, thus registering the indicia at the time the photograph is taken, and upon the margin thereof.

The indicia strip mounting 11 consists of a longitudinal channel member 17 which extends approximately the width of the camera. Upon its one end is formed a socket 18 within which the end of the indicia strip rests. The opposite end of the member 17 is formed with a shield 19 having a passage 20 therethrough of approximately the same configuration as the transverse section of the indicia strip. A piece of rubber or fabric 33 is fitted around the passage 20 to prevent the film being fogged. The shield 19 has a bearing plate 21 mounted upon its outer edge and adapted to bear against the camera wall 22, said mounting being pivoted to the wall by means of a pivot pin 23 which extends through a portion of the wall and into engagement with a plate 21′ similar to the plate 21, which is mounted in a countersunk portion 24 of the camera wall 22. The member 18 is pivotally mounted within the wall 25 of the camera by means of a pin 26. It will thus be seen that the entire structure hereinbefore described is adapted to pivotally move toward and away from the film or plate.

When it is desired to mark indicia upon the film the indicia strip is inserted through opening 20 in the plate 21' and through the shield member 19. The portion 13 thereupon engages the channel in the longitudinally extending member 17 and when in proper position will terminate within the member 18. It will be noted, however, that if the indicia strip mounting were rigid, trouble would arise in inserting the strip as it would scrape the film and make it difficult to properly place in position. It is to obviate this that I have pivotally mounted the indicia strip as shown in Fig. 2 and again in Figs. 5 and 6. When the indicia strip is desired to be pressed against the film a thumb engaging portion 27 is pressed toward the back of the camera. This in turn swings the plates 21 and 21' upon their pivots.

In order to secure the indicia strip in position against the film or away from it a ratchet pawl 28 is provided. The ratchet pawl is formed with beveled ratchet teeth which engage a beveled tooth 28' on the plate 21'. A spring 29 normally presses the pawl to yieldably hold it in engagement with the tooth 28''. On manual rocking of the plate the tooth thereon will ride over the inclined face of a tooth on the pawl and depress the latter in opposition to the spring. On releasing the plate the tooth thereon will be engaged in another position on the pawl, thus securing the plate against free movement and retaining the strip in its desired position. An escutcheon plate 30 is mounted over the plate 21' to conceal the mechanism thereunder. Said plate is formed with an opening 31 through it to accommodate the radial travel of the indicia strip.

In the operation of my device the indicia strip is marked with an inscription, as indicated in Fig. 7, and is then inserted into the device, as hereinbefore described. It will be noted that when the indicia strip is in its proper position it will be in the path of the light rays which pass through the lens to the film and that when a shutter actuating plunger 32 is pressed and the shutter opened the film will be simultaneously exposed to the subject of the photograph and the inscription upon the indicia screen.

What I claim is:

1. In a camera, a box for the reception of a sensitized element, a bar arranged to extend transversely of the sensitized element, said bar having a longitudinal guide channel, and a translucent strip formed with a flange adapted to be engaged by said channel the body of the strip to depend from the bar adjacent the sensitized element.

2. In a camera, a box for the reception of a sensitized element, a rail adjacent one margin of the area of exposure of the sensitized element, a translucent indicia strip, and means for slidably mounting said strip in the rail.

3. In a camera, a box adapted to receive a sensitized element, said box provided with a slot, a rail having a longitudinal channel and arranged in the box to extend adjacent the sensitized element, a translucent strip having a longitudinal rib slidably engageable with the channel in the rail adapted to be inserted and removed through the slot in the box, and a resilient curtain for closing said slot.

4. In a camera, a box for the reception of a sensitized element, a pivotally mounted bar arranged to extend transversely of the sensitized element, said bar having a longitudinal guide channel, and a translucent strip formed with a flange adapted to be engaged by said channel to suspend the strip adjacent the sensitized element.

5. A device for recording inscriptions on sensitized elements comprising the combination with a camera having a lens and adapted to contain a sensitized element, or a translucent indicia strip and pivotally mounted means for detachably supporting said strip within the camera between the camera lens and the sensitized element adjacent the surface of said sensitized element, whereby on exposing the sensitized element through the camera lens an inscription on the indicia strip will be photographically recorded on the sensitized element, and means whereby said strip may be inserted and removed through the wall of the camera.

6. In a camera, a box for the reception of a sensitized element, a pivotally mounted bar arranged to extend transversely of the sensitized element, said bar having a longitudinal guide channel, a translucent strip formed with a flange adapted to be engaged by said channel to suspend the strip adjacent the sensitized element, and means for locking the pivoted bar against movement.

7. In a camera, a box for the reception of a sensitized element, said box having a side opening, a pivoted channel member arranged interiorly of the box, a shield attached to the channel member and extending over the opening in the box, said shield having a passage therethrough, and an indicia strip insertible through said passage and engageable with said channel member.

8. In a camera, a box for the reception of a sensitized element, said box having a side opening, a pivoted channel member arranged interiorly of the box, a shield attached to the channel member and extending over the opening in the box, said shield having a passage therethrough, and an indicia strip insertible through said passage and engageable with said channel member, and means engageable with said shield for locking said channel member against movement.

9. In a camera, a box for the reception of a sensitized element, said box having a side opening, a pivoted channel member arranged interiorly of the box, a shield attached to the channel member and extending over the opening in the box, said shield having a passage therethrough, and an indicia strip insertible through said passage and engageable with the channel member, and means on the shield for normally closing the passage.

10. In a camera, a box having a side opening, a pivoted shield extending across said opening, said shield having a ratchet tooth thereon, and having an opening therein, a pawl engageable with said ratchet tooth and an indicia strip insertible through said opening.

11. In a camera, a box having a side opening, a pivoted shield extending across said opening, said shield having a ratchet tooth thereon, and having an opening, a pawl engageable with said ratchet tooth, an indicia strip insertible through said opening, and means within the box for engaging and supporting said indicia strip.

12. In a camera, a box having a side opening, a pivoted shield extending across said opening, said shield having a passage therethrough, an indicia strip insertible through said passage, and means for yieldably holding the shield in several positions.

In testimony whereof I have here signed my name to this specification.

WILLIAM F. GONGAWARE.